United States Patent
Tsuchiya

(10) Patent No.: US 7,028,805 B2
(45) Date of Patent: Apr. 18, 2006

(54) VEHICLE STEERING CONTROL DEVICE FOR CONTROLLING STEERING ASSIST TORQUE

(75) Inventor: Yoshiaki Tsuchiya, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/846,680

(22) Filed: May 17, 2004

(65) Prior Publication Data

US 2004/0238265 A1    Dec. 2, 2004

(30) Foreign Application Priority Data

May 28, 2003 (JP) .............................. 2003-150833

(51) Int. Cl.
*B60T 8/32* (2006.01)
(52) U.S. Cl. ........................................ 180/446; 701/41
(58) Field of Classification Search ................ 180/446, 180/443, 421; 701/41
See application file for complete search history.

(56) References Cited

U.S. PATENT DOCUMENTS

| | | | | |
|---|---|---|---|---|
| 4,941,097 A | * | 7/1990 | Karnopp et al. ............... | 701/41 |
| 5,141,069 A | * | 8/1992 | Yasui .......................... | 180/422 |
| 5,230,396 A | * | 7/1993 | Yasui .......................... | 180/422 |
| 5,627,754 A | * | 5/1997 | Asanuma et al. .............. | 701/41 |
| 6,360,150 B1 | * | 3/2002 | Fukushima et al. ............ | 701/41 |
| 6,374,162 B1 | * | 4/2002 | Tanaka et al. ................. | 701/1 |
| 6,415,212 B1 | * | 7/2002 | Nishizaki et al. .............. | 701/41 |
| 6,463,369 B1 | * | 10/2002 | Sadano et al. ................. | 701/28 |

FOREIGN PATENT DOCUMENTS

JP          A 11-20728          1/1999

* cited by examiner

*Primary Examiner*—Tony Winner
(74) *Attorney, Agent, or Firm*—Oliff & Berridge, PLC

(57) ABSTRACT

A steering control device of a vehicle, equipped with power steering system, provides information of a turning limit during an initial phase of understeer condition for a driver, with a temporal reduction of torque for rotating a steering wheel by increasing steering assist torque. If the understeer condition is advanced after the information is generated, steering torque is increased in the direction of turning the vehicle by decreasing the steering assist torque, discouraging the driver from rotating the steering wheel in the turning direction. As an angular speed of rotating the steering wheel increases, steering torque is modulated to be higher, in order to limit the increase of steering angle of steered wheels due to the rotation of the steering wheel as small as possible. At a low vehicle speed, the modification of steering assist torque may not be executed.

10 Claims, 6 Drawing Sheets

STEERING WHEEL ANGULAR SPEED
(ABSOLUTE VALUE)

VEHICLE STEERING CONTROL DEVICE FOR CONTROLLING STEERING ASSIST TORQUE

BACKGROUND OF THE INVENTION

1. Field of the Invention

The present invention relates to a device for controlling steering characteristics (i.e. handling characteristics) of a vehicle such as an automobile, and more specifically, to such a device that controls steering assist torque when a vehicle falls into understeer condition.

2. Description of Prior Art

In a modern power steering system equipped on a vehicle, torque applied to steered wheels for assisting a steering action of a driver (steering assist torque) is controlled based upon parameters of running conditions of the vehicle, such as a vehicle speed. So far, in addition to the purpose of the reduction of torque required for rotating a steering wheel (steering torque), steering control devices are variously designed so as to provide a driver with comfortableness and safety in driving a vehicle.

In some of power steering systems, steering control devices modify steering torque, felt by a driver, for avoiding deterioration of vehicle-running behavior, such as understeer (drift-out) condition, by regulating steering assist torque using information of vehicle running behavior obtained with sensors. Japanese Patent Laid-Open Publication No. 11-20728, for instance, discloses a steering control device of an electric power steering (EPS) system, which is designed to decrease steering assist torque in direction of turning a vehicle in response to the turning vehicle falling into understeer condition. Through making it hard to rotate a steering wheel in the turning direction, this control device warns a driver against rotating a steering wheel further in the turning direction, preventing the vehicle behavior from getting worse.

According to a conventional control strategy of a steering control device as described above, it is difficult for the driver to feel an actual condition of the vehicle and its variation because steering torque is modified to be simply increased in response to a vehicle falling into understeer condition. Without such a modification, steering torque no longer increases when the vehicle falls into understeer condition (steering torque is the reaction from a road surface gripped with a tire on a steered wheel so that steering torque is saturated in understeer condition). Thus, a skilled driver, who knows such characteristics of steering torque, could notice a limit of the turning of a vehicle, where tires on steered wheels can increase no more centripetal force (understeer condition), from slight variation or reduction of steering torque during the rotating of the steering wheel. However, according to a simple increase of steering torque through the steering torque modification in the conventional control strategy, it would be difficult for a driver to feel the limit of the turning of a vehicle because no reduction of steering torque occurs even when a vehicle falls into understeer condition.

Further, in prior art as described above, there is no proposal of the way of determining an increment (decrement) of steering torque (steering assist torque) during its modification for understeer condition. Steering operation of a driver varies dependent upon vehicle running conditions, a road condition, a driver's skill, etc. In order to render the modification of steering torque compatible with variable driver's steering operation, the increment of steering torque in its modification should be determined taking into account steering operational condition together with vehicle running conditions.

Accordingly, a conventional steering control device may be improved more appropriately in conjunction with the modification of steering torque for avoiding and/or escaping from understeer condition.

SUMMARY OF INVENTION

According to the present invention, there is provided a novel vehicle steering control device for assisting driver's steering operation, improved for warning a driver of the deterioration of the vehicle running condition (ensuring that a driver is informed of a vehicle falling into understeer condition) and thereby avoiding deterioration of a vehicle falling into understeer condition. The vehicle, provided with the inventive control device, has a steering wheel (a steering handle), steered wheels, a power steering apparatus steering the steered wheels at a steering angle determined by rotating the steering wheel, and at least one sensor monitoring a vehicle running condition. The power steering apparatus generates steering assist torque under the control of the steering control device. The inventive control device comprises a portion of determining steering assist torque in response to steering torque on the steering wheel; a portion of generating a value indicating understeer condition of the vehicle based upon a vehicle running condition monitored with the at least one sensor; and a portion of modifying the steering assist torque, which portion increases the steering assist torque in a direction of turning the vehicle when the value indicating understeer condition is higher than a first reference value. The value indicating understeer condition, for example, may be a drift-out value determined based upon a yaw rate of the vehicle body and more specifically, the difference between an actual yaw rate and a standard yaw rate (expected for a normally running vehicle) determined in any way known in the art.

As already described in the section of Prior Art, without a modification of steering torque through regulation of steering assist torque, in general, steering torque is gradually reduced with the increase of a steering angle after a vehicle has fallen into understeer condition, allowing a driver, especially a skilled one, to notice a turning limit from the slight reduction of steering torque. Thus, the lack of the slight reduction of steering torque as in the aforementioned conventional control strategy would cause a feeling that the response of vehicle behavior is incompatible with a steering operation.

In the aforementioned inventive control device, in order to make a driver notice clearly that her vehicle is falling into understeer condition without feeling incompatibleness of the response of vehicle behavior with her steering operation, steering torque is reduced by increasing the steering assist torque in the turning direction of the vehicle. In other words, the reduction of steering torque may be considered as information of a turning limit, provided to a driver. In operation, during turning a vehicle, a driver will cease or reverse the rotation of a steering wheel in response to the reduction of steering torque. Accordingly, the first reference value will be set to a value indicating understeer condition around which a vehicle is falling into understeer condition.

It is possible that a driver continues rotating a steering wheel in the direction of turning a vehicle even after the reduction of steering torque, leading to further deterioration of the vehicle behavior, i.e. increasing the value indicating understeer condition. In order to avoid this, in the inventive control device, the assist torque modifying portion may cease the increasing of the assist torque when the value indicating understeer condition is higher than a second reference value higher than the first value. More preferably, after the value indicating understeer condition exceeds the second value, steering torque is increased in the direction of turning the vehicle by decreasing steering assist torque. This increase of steering torque will discourage the driver from rotating the steering wheel in the turning direction.

Preferably, the decrement of steering torque when the value indicating understeer condition exceeds the first reference value is regulated dependent upon an angular or rotational speed of a steering wheel. When a driver rotates a steering wheel at a relatively high speed, the reduction of the steering torque would induce excessive rotation of the steering wheel. Thus, the decrement of steering torque, i.e. increment of the steering assist torque may be nullified when an angular speed of rotating a steering wheel exceeds a reference value (namely, the assist torque modifying portion execute no increasing modification of steering assist torque.). Further, the rotation amount of a steering wheel (i.e. increment of a steering angle) during the reduction of steering torque should be as small as possible. Thus, preferably, the higher the angular speed of the steering wheel is the smaller the decrement of steering torque is regulated (the larger the steering torque is).

Similarly, the increment of steering torque, namely, the decrement of steering assist torque after the value indicating understeer condition exceeds the second value is increased as an angular speed of rotating a steering wheel increases, avoiding further rotation of the steering wheel. Further, preferably, this increment of steering torque is also more increased when the value indicating understeer condition is larger. This is because the necessity for restricting the rotation of a steering wheel in the direction of turning a vehicle become larger as the vehicle condition is getting worse.

However, it is preferable to provide an upper limit for the increment of steering torque. This is because, if steering torque becomes too large for a driver to rotate a steering wheel, the driver will feel a certain fear of losing the steering controllability.

By the way, when a vehicle speed is relatively low, the necessity of the modification of steering torque is low because the risk of understeer condition is relatively low. Further, in general, a value indicating understeer condition is relatively inaccurate at a low vehicle speed: often, understeer condition is erroneously judged when a vehicle turns a corner in a crossroad at a low speed. Thus, the modifications of steering torque as described above may not be executed when a vehicle speed is below a reference speed. Since the necessity of the steering torque modification decreases together with the decrease of the vehicle speed, the amounts of the reduction of steering torque for the information of a turning limit and the increase of steering torque for discouraging the rotation of a steering wheel may be decreased as a vehicle speed decreases.

Thus, it is an object of the present invention to provide new and novel steering control devices for a vehicle such as automobile, which devices modify steering torque felt by a driver of the vehicle in order to avoid deterioration of a running condition of the vehicle without inducing a feeling of incompatibleness between a steering action and the response of the vehicle.

It is another object of the present invention to provide such devices wherein steering torque is reduced in the direction of the turning of a vehicle in response to detection of a vehicle falling into understeer condition or being close to a limit of the turning of the vehicle for providing clear information of turning limit and surely warning a driver of the vehicle running condition.

It is a further object of the present invention to provide such devices wherein steering torque is increased in the direction of the turning of a vehicle when a driver continues an unwanted steering operation after the reduction of the steering torque, thereby avoiding further deterioration of the vehicle running condition.

It is a further object of the present invention to provide such devices that control steering torque or steering assist torque during a vehicle falling into understeer condition based upon an angular speed of rotating a steering wheel for avoiding unwanted increasing of a steering angle.

It is another object of the present invention to provide such devices wherein undesirable modification of the steering torque is avoided when a vehicle speed is relatively low.

It is another object of the present invention to provide such devices wherein the amounts to be modified of steering torque during a vehicle falling into understeer condition is modulated based upon conditions of a steering operation, a vehicle speed, vehicle running conditions, etc.

Other objects and advantages of the present invention will be in part apparent and in part pointed out hereinafter.

BRIEF DESCRIPTION OF THE DRAWINGS

In the Accompanying Drawings.

DESCRIPTION OF PREFERRED EMBODIMENTS

Figure 1:
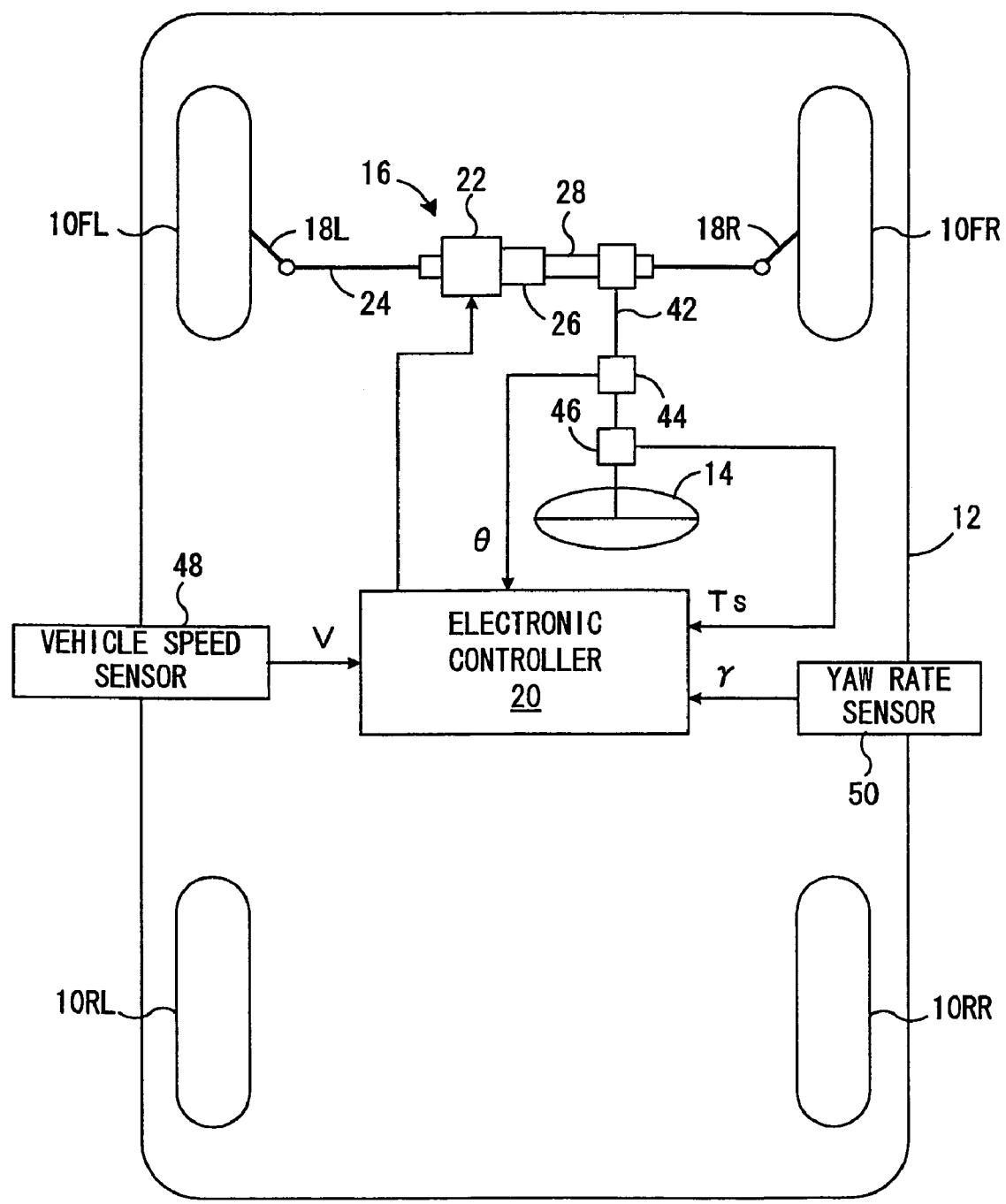
FIG. 1 is a diagrammatical view of one embodiment of a four wheeled, rear drive vehicle incorporating a vehicle steering control device controlling steering assist torque according to the present invention.

FIG. 1 diagrammatically shows one embodiment of a four-wheel, rear drive vehicle incorporating a steering control device according to the present invention (for clarity of the drawing, omitted are most components irrelevant to the operation of the inventive steering control device.). In this connection, it will be readily understood from the explanation described below that a vehicle incorporating the inventive steering control device may be a four-wheel, front drive vehicle or a four-wheel drive vehicle.

The vehicle includes a vehicle body 12, front right wheel 10FR, front left wheel 10FL, rear right wheel 10RR and rear left wheel 10RL supporting the vehicle body 12 via the respective suspension means (not shown in the figure). As usual, the vehicle is also provided with an engine adapted to output a driving torque according to a throttle valve opening in response to the depression of an acceleration pedal by the driver, a hydraulic torque converter and an automatic transmission transmitting a rotational driving force from the engine to the rear wheels 10FL, FR through a differential gear system (not shown) and driving shafts. Further, although not shown in the drawing, the vehicle is provided with a brake system, which includes a hydraulic circuit, a brake pedal adapted to be depressed by a driver, a master cylinder for supplying a master cylinder pressure to the hydraulic circuit means according to the depression of the brake pedal, and wheel cylinders each adapted to apply a braking force to each corresponding one of the wheels 10FL-10RR.

The front right and front left wheels 10FR, FL are steered, via a pair of tie rods 18R, 18L, by an EPS apparatus 16 of a rack-and-pinion type according to a rotation of a steering wheel 14 by a driver. The EPS apparatus 16 may be of a rack assist a type, in which reciprocal force converted from rotational torque of an electric motor 22 by a ball and screw type converter apparatus 26 is added into reciprocal force for a rack bar 24 relative to a housing 28 derived from the rotation of the steering wheel 14. The rotational torque generated by the motor 22 is steering assist torque regulated under the control of an electronic controller 20.

The electronic controller 20 may be of an ordinary type including a central processor unit, a read only memory, a random access memory, input and output port means and a common bus interconnecting these elements (not shown). To the controller 20, fed are at least a signal of a rotational angle $\theta$ of the steering wheel 14 from an angular sensor 44 mounted on a steering shaft; a signal of steering torque Ts from a torque sensor 46 also mounted on the steering wheel 14; a signal of a vehicle speed V from a vehicle speed sensor 48; and a signal of a yaw rate $\gamma$ from a yaw rate sensor 50. Based upon the data of those signal, the controller 20 determines steering assist torque to be added to the rack bar 24 together with steering torque by a driver and then operates the motor 22, generating the steering assist torque. For determining the steering assist torque, a drift value DV, a value indicating understeer condition, may be also calculated in the controller 20.

As described in the section of Summary of the Invention, one of the features in the present invention is in that steering torque, required for rotating the steering wheel 14, i.e. that a driver feels on a steering wheel, is modulated for providing information that a vehicle reaches to a turning limit when a vehicle falls into understeer condition.

Figure 2:
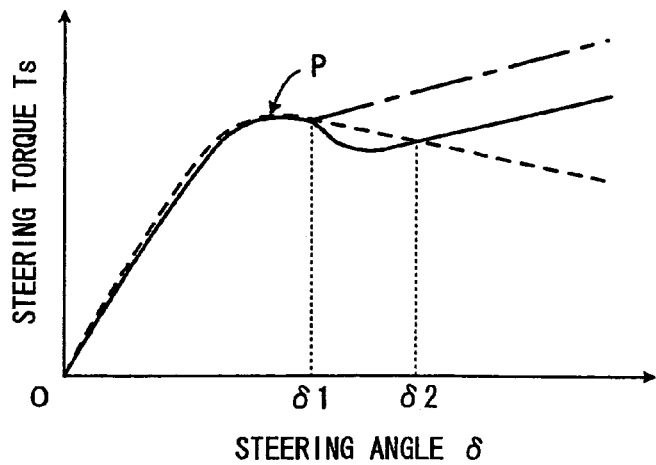
FIG. 2 shows the variation of steering torque Ts during the increase of steering angle δ of steered wheel in accordance with the inventive control device (solid line) [For the purpose of comparison with prior art, variations of steering torque without modification of steering assist torque (broken line) and in one of prior art (dashed line) are shown.]

FIG. 2 shows a graph of an exemplary variation of steering torque Ts with increases of a steering angle $\delta$ of the steered front wheels according to an operation of the inventive steering control device (solid line). In this graph, there are depicted variations of steering torque without the modification of steering assist torque (a broken line) and in accordance with a strategy of modification of steering assist torque in the aforementioned prior art (e.g. JP 11-20728 (an alternate long and short dash line) for comparison with the present invention.

As known in the art, a normal EPS system without a modification of steering assist torque is designed to increase steering torque Ts together with a steering angle $\delta$ in response to the reaction from a road surface interacting with tires on the wheels until it reaches to a peak point P where a vehicle falls into understeer condition (the broken line). After then, steering torque Ts gradually decreases together with the reduction of the reaction from the road surface. Thus, the steering wheel should not be rotated in the direction of turning a vehicle after the steering angle $\delta$ reaches to the peak point P. In the operation of the aforementioned prior art with modification of steering assist torque as seen from the graph (the dashed line), steering torque will be simply increased after the steering angle reaches to the peak point P. In this case, it is possible that a driver does not notice that a vehicle falls into understeer condition while the driver may be discouraged from rotating the steering wheel due to the increase of steering torque.

In the present invention, steering torque Ts is once reduced by increasing steering assist torque in response to a turning vehicle falling into understeer condition at $\delta 1$ around the peak point P, and thereby a driver is informed that the vehicle reaches to a turning limit, and expected to reduce a steering angle by rotating the steering wheel in the direction opposite to the turning of the vehicle. However, if the steering angle is increased, i.e. the vehicle condition is further deteriorated (the vehicle falls into understeer condition more deeply) e.g. in a case that the driver continues to rotate the steering wheel, steering torque is then increased at $\delta 2$ by decreasing steering assist torque, discouraging the rotation of the steering wheel in the turning direction.

In this drawing, there is shown that the reduction and increase of steering torque occur at steering angles $\delta 1$ and $\delta 2$, respectively. However, a steering angle at which a vehicle falls into understeer condition is varied dependent upon a road condition vehicle speed, etc., so that the timings of the reduction and increase of steering torque Ts are determined based upon a drift value DV. Further, the magnitude of steering torque under the control of the modulation against understeer condition is set to be larger as an angular speed of rotating the steering wheel increases because the increase of the steering angle $\delta$ should be as small as possible (Faster rotational speed of the steering wheel would make the increment of the steering angle larger until the driver stops the rotation of the steering wheel). Other features to be noted in the control of steering torque in the present invention are pointed out in the following explanation in conjunction with an exemplary flowchart shown in FIG. 3.

Figure 3:
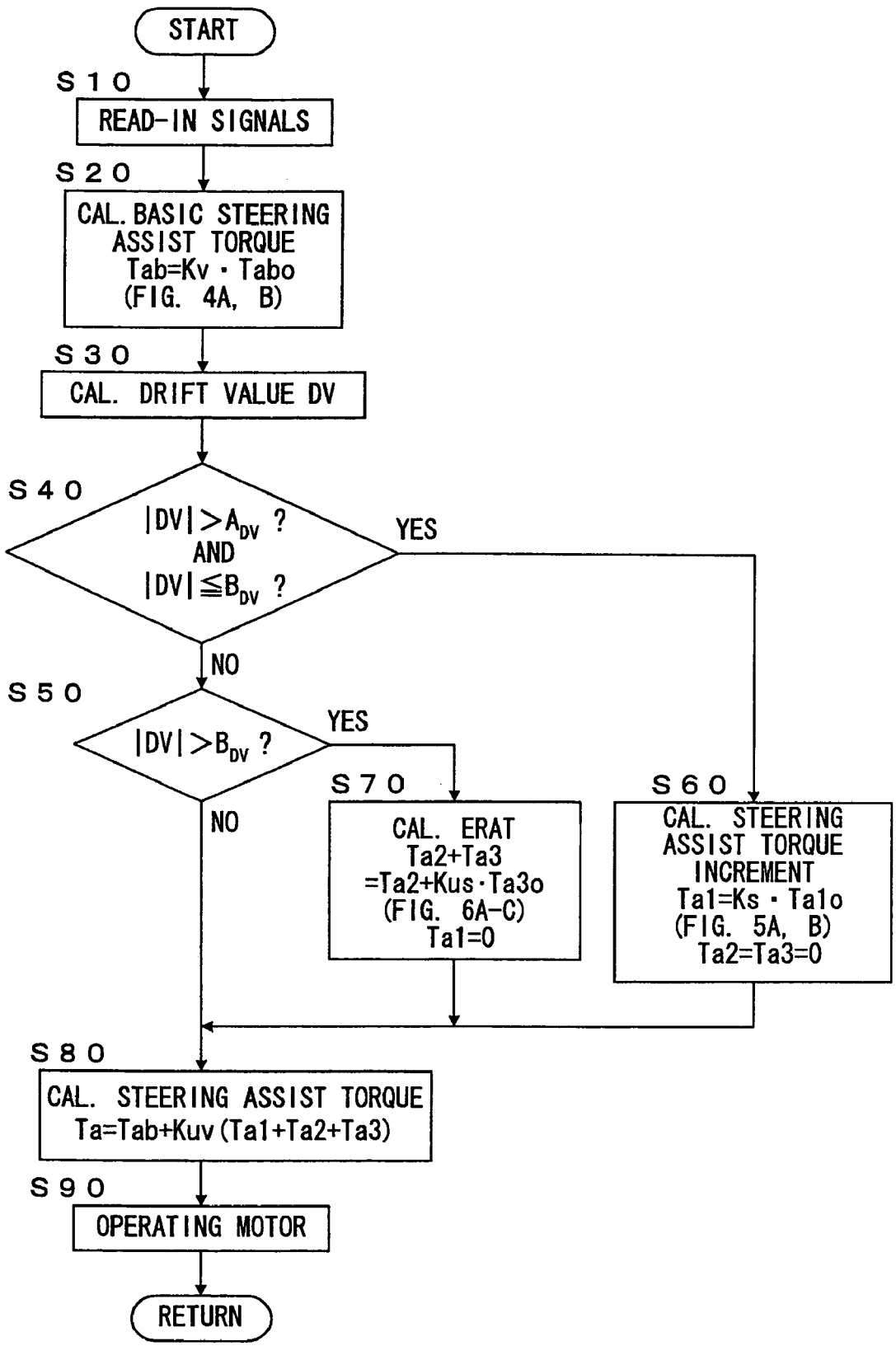
FIG. 3 is a flowchart showing a control routine of modification of steering assist torque, executed in a preferred embodiment in FIG. 1 according to the present invention.

The control routine in the flowchart of FIG. 3 is executed in the controller 20 in FIG. 1, which routine may be started by a closure of an ignition switch (not shown in FIG. 1) and cyclically repeated at a cycle time such as several milliseconds during the operation of the vehicle. In the following processes, a steering wheel angle $\theta$, a steering angle $\delta$, a yaw rate γ, steering torque Ts, steering assist torque Ta, Tab, etc. and a drift value DV in the rightward direction are defined as positive. A vehicle speed in the forward direction is defined as positive.

Figure 4A:
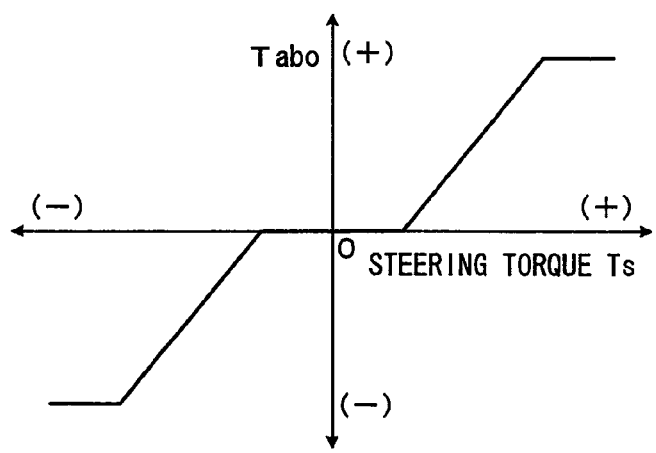
FIG. 4A shows a map of (primitive) basic steering assist torque as a function of steering torque, used in step 20 of the flowchart of FIG. 3.
Figure 4B:
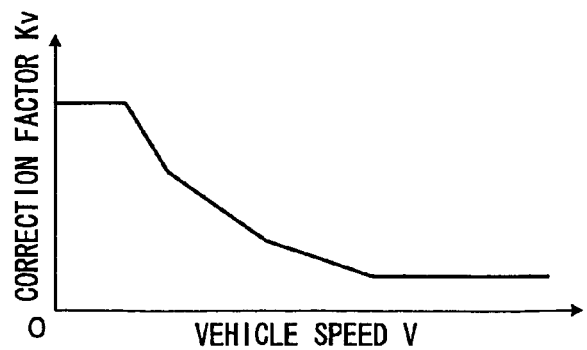
FIG. 4B shows a map of a factor for correcting basic steering assist torque with respect to a vehicle speed, used in step 20 of the flowchart of FIG. 3.

Firstly, in step 10, the signals shown in FIG. 1 are read in. Then, in step 20, there is determined a basic steering assist torque Tab as follows:

$$Tab = Kv \cdot Tabo \quad (1)$$

where Tabo is a primitive basic steering torque as a function of steering torque Ts, determined using a map in FIG. 4A; and Kv, a correction factor with respect to a vehicle speed V, determined using a map in FIG. 4B. As seen from the maps, Tab is increased with steering torque Ts, monitored with the torque sensor 46 and decreased with a vehicle speed V. It should be noted that this basic steering assist torque Tab is always added to steering torque Ts unless a vehicle falls into understeer condition. The basic steering assist torque may be determined in the other appropriate ways known in the art.

Then, in step 30, a drift value DV is determined in an appropriate way known in the art, using vehicle speed V and yaw rate γ, monitored with the respective sensors. For instance, the drift value DV may be determined as follows:

$$DV = \gamma t - \gamma \quad (2)$$

where γt is a standard yaw rate, determined as follows:

$$\gamma t = V \cdot \delta / \{(1 + Kh \cdot V^2) \cdot H \cdot (1 + \tau \cdot s)\} \quad (3)$$

where δ is a steering angle determined based upon a steering wheel angle θ; Kh, a stability factor; H, the length of a wheel base; σ and s, a time constant and a frequency parameter of Laplace transformation. This drift value DV is the deviation of an actual yaw rate from an expected yaw rate (standard yaw rate), indicating that a vehicle, turning rightward, falls into understeer condition when DV>0. The degree of deterioration of a vehicle running condition (yaw attitude of the vehicle body) gets worse as the magnitude of DV increases. Further details are described elsewhere. It should be noted that DV may be determined in a different process or different device of Vehicle Stability Control (VSC) and read-in together with signals from sensors in step 10.

Then, it is judged whether or not the absolute value of the drift value |DV| is in the range between the first reference value $A_{DV}$ and the second reference value $B_{DV}$ in step 40 and whether or not |DV| is higher than $B_{DV}$ in step 50. $A_{DV}$ may be set to a value of DV corresponding to when or just after a vehicle falls into understeer condition. $B_{DV}$ may be set to an appropriate value higher than $A_{DV}$. $A_{DV}$ and $B_{DV}$ may be determined experimentally and/or theoretically.

When |DV|≦$A_{DV}$, in which a vehicle has not fallen into understeer condition, no modification of Tab is executed as seen in the range of steering angle between 0 and δ1 in FIG. 2, and accordingly, the basic steering assist torque is applied directly to the rack bar 24 (in Step 90).

When $A_{DV}$<|DV|≦$B_{DV}$, where a vehicle is falling into understeer condition, steering assist torque is modified to be increased relative to the basic steering assist torque, thereby reducing steering torque Ts, felt by a driver as shown in the range between δ1 and δ2 in FIG. 2, for providing information that tire force on the steered wheels reaches to a turning limit, where a vehicle body starts drifting out away from a turning center.

Figure 5A:
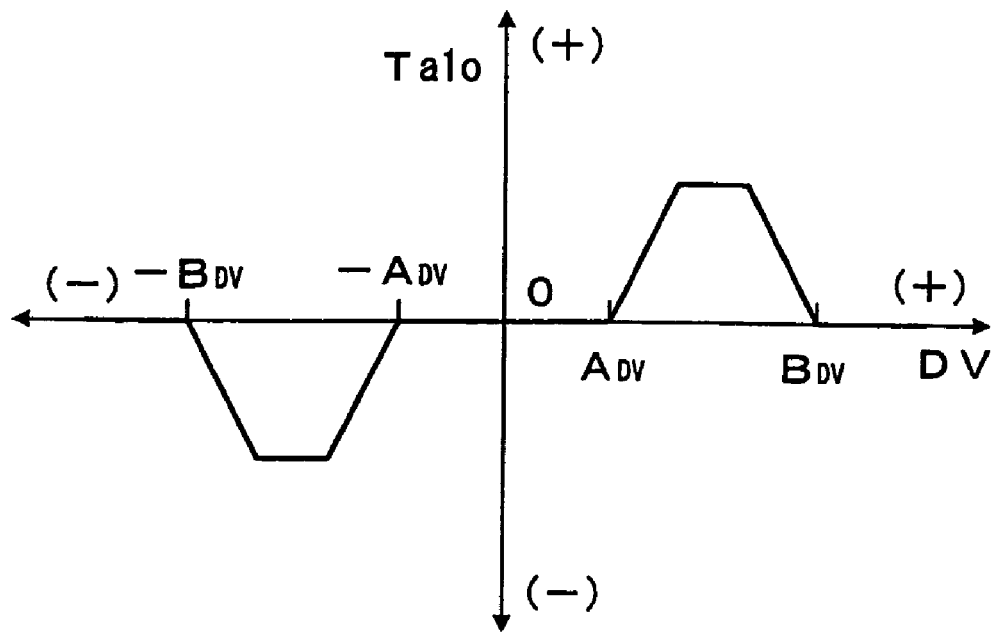
FIG. 5A shows a map of (primitive) steering assist torque increment in an initial phase of understeer condition as a function of a drift value, used in step 60 of the flowchart of FIG. 3.

The increment of the steering assist torque, Ta1, is calculated as follows (in Step 60):

$$Ta1 = Ks \cdot Ta1o \quad (4)$$

where Ta1o is a primitive value of the steering assist torque increment Ta1, determined as a function of DV using a map shown in FIG. 5A; KS, a factor, determined as a function of an angular speed, dθ, of the rotating of the steering wheel 14, using a map shown in FIG. 5B, for correcting the primitive value with respect to steering speed.

Figure 5B:
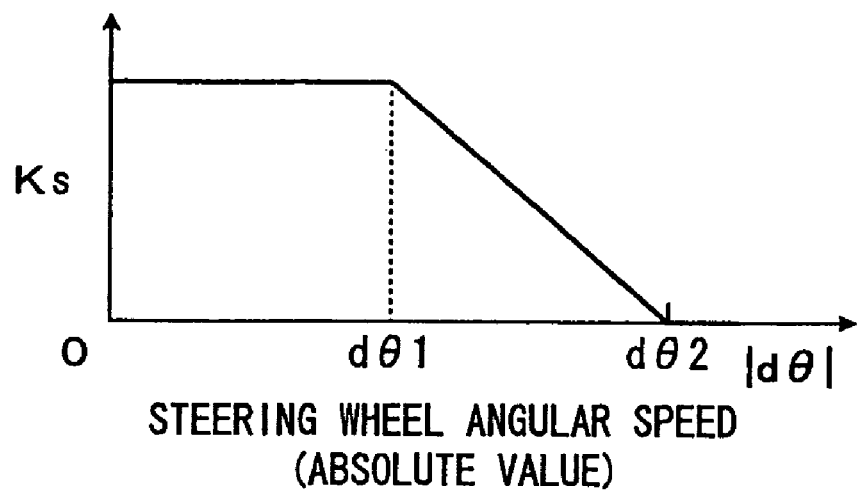
FIG. 5B shows a map of a factor for correcting the steering assist torque increment with respect to an angular speed of steering wheel rotation, used in step 60 of the flowchart of FIG. 3.

As seen from the expression (4) and the maps in FIGS. 5A and 5B, the increment of steering assist torque, generated only during an initial term (between $A_{DV}$ and $B_{DV}$) after a vehicle falls into understeer condition, is rendered smaller as the speed of rotating the steering wheel increases. At a fast rotating speed of the steering wheel, the angle of the steering wheel, i.e. steering angle δ of the steered front wheels, would be liable to be undesirably larger in the turning direction of a vehicle due to the decrease of the steering torque. In order to avoid such unwanted rotation of the steering wheel upon the reduction of the steering torque, the increment of steering assist torque is set smaller as the angular speed of rotating the steering wheel increases. If the rotating speed exceeds a certain value dθ2, Ta1 will be set to 0, and therefore no modification of steering assist torque will be executed.

Referring to FIG. 5B, the first reference angular speed (absolute value) dθ1, at which Ks is started to be reduced, and the second reference, dθ2, at which Ks becomes to 0, may be appropriately determined in any experimental and/or theoretical ways.

As described later, the steering assist torque increment Ta1 will be further modified with respect to a vehicle speed. Also, torque components, Ta2 and Ta3, as described below, are nullified in this step.

When |DV|>$B_{DV}$, steering assist torque is modified to be decreased relative to the basic steering assist torque, thereby increasing steering torque Ts, as shown in the range of steering angle δ larger than δ2 in FIG. 2, for discouraging the driver from continuing the rotating of the steering wheel in the turning direction of the vehicle.

Figure 6A:
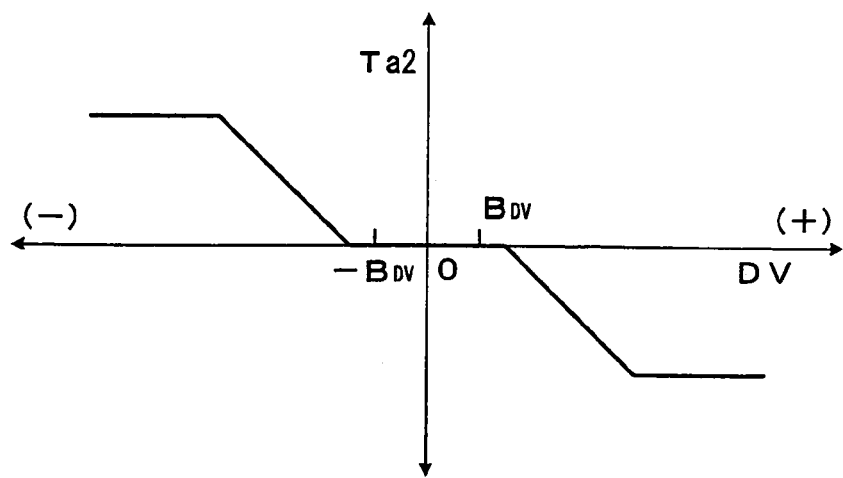
FIG. 6A shows a map of a first excessive rotation avoiding torque (ERAT; for avoiding increase of steering wheel angle) as a function of a drift value, used in step 70 of the flowchart of FIG. 3.

So called, excessive rotation avoiding torque (ERAT; for avoiding increase of steering wheel angle), i.e. the decrement of steering assist torque, may be calculated by adding two terms of torque as follows (in Step 70):

$$Ta2 + Ta3 \quad (5)$$

where Ta2 is the first ERAT, determined as a function of DV using a map as shown in FIG. 6A; Ta3 is the second ERAT, determined as a function of DV and dθ angular speed of the rotating of the steering wheel. Ta3, is calculated by Kus·Ta3o, where Ta3o is a primitive second ERAT, determined in accordance with angular speed of the rotating of the steering wheel, dθ, using a map shown in FIG. 6B; and Kus, a factor for correcting Ta3o with DV using a map shown in FIG. 6C.

Figure 6B:
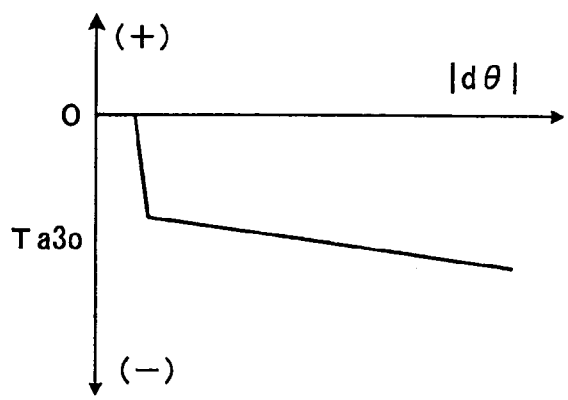
FIG. 6B shows a map of a second ERAT as a function of an angular speed of steering wheel rotation, used in step 70 of the flowchart of FIG. 3.
Figure 6C:
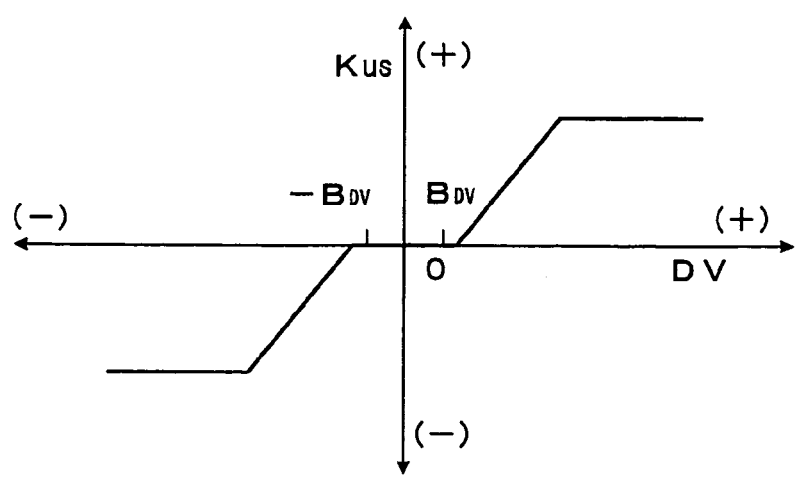
FIG. 6C shows a map of a factor for correcting the second ERAT with respect to a drift value, used in step 70 of the flowchart of FIG. 3.

As seen from the maps in FIG. 6A-C, ERAT, directed opposite to the turning direction of a vehicle, is varied so as to increase steering torque together with the increasing of DV, i.e. the deviation of an actual yaw rate from a standard yaw rate expected in absence of unwanted slippage in the vehicle, resulting in that it is harder for a driver to rotate the steering wheel as the deterioration of vehicle condition is advanced.

Further, ERAT is set so as to increase steering torque with the increase of a steering speed. As described above, the faster angular speed of rotating the steering wheel would make the rotated amount in steering angle larger. Thus, by making it harder to rotate the steering wheel as the steering speed increases, the rotated amount is made as small as possible when the driver continues rotating the steering wheel even after the information of turning limit is provided. Since Ta2 is not dependent upon the angular speed of steering wheel rotation, a certain amount of ERAT is applied even when the steering wheel is substantially held, encouraging a driver to rotate the steering wheel in the direction opposite to the turning of the vehicle.

As seen from the maps of FIGS. 6A and 6C, for ERAT, an upper limit is set out. The decrement of steering torque does not increase limitlessly with DV. This is for avoiding that a driver feels a fear of steering uncontrollability due to excessive increase of steering torque. The upper limit may be determined experimentally and/or theoretically.

ERAT, Ta2 and Ta3 will be further modified in step 80 with respect to a vehicle speed. Also, the torque component Ta1 is nullified in this step.

Figure 7:
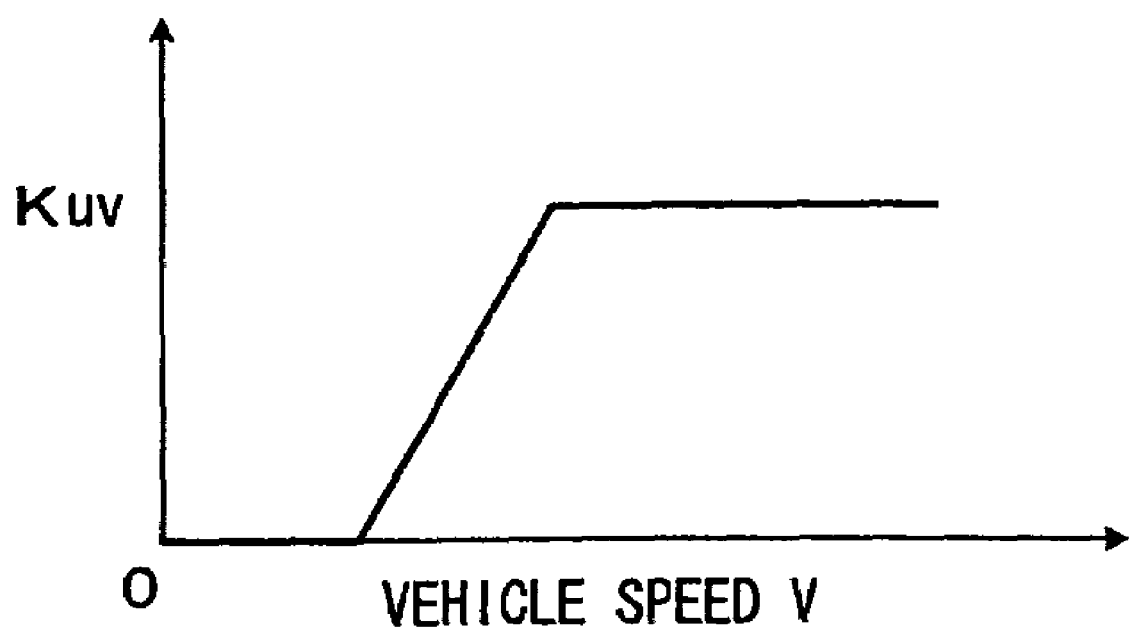
FIG. 7 shows a map of a factor for correcting the steering assist torque increment or ERAT with respect to a vehicle speed, used in step 80 of the flowchart of FIG. 3.

Then, in Step 80, steering assist torque is calculated, using Ta1, or Ta2 and Ta3, determined in the previous steps, as follows:

$$Ta = Tab + Tus \quad (6)$$

where Tus is the modified amount of steering assist torque for understeer condition, determined by:

$$Tus = Kuv \cdot (Ta1 + Ta2 + Ta3) \quad (7)$$

where Kuv is a correction factor determined as a function of a vehicle speed V using a map of FIG. 7, for correcting torque components Ta1, Ta2 and Ta3. As seen from the map, the modified amount of steering assist torque Tus is reduced when a vehicle speed is low because the necessity of the modification of steering assist torque against understeer condition is low as described in the section of Summary of Inventions.

Then, in accordance with the value of the expression (6), the motor is operated in step 90.

In summary, the amounts of steering assist control, dependent upon DV, are as follows:

$$Ta = Tab(Ts, V) \text{ for } |DV| \leq A_{DV}$$

$$Ta = Tab(Ts, V) + Kuv(V) \cdot Ta1(DV, d\theta) \text{ for } A_{DV} < |DV| \leq B_{DV}$$

$$Ta = Tab(Ts, V) + Kuv(V) \cdot \{Ta2(DV) + Ta3(DV, d\theta)\} \text{ for } |DV| > B_{DV}.$$

where parameters for each torque component are in parentheses. Accordingly, steering torque is varied as steering angle δ increases, as shown in FIG. 2.

In the above process, preferably, the first reference value for DV, $A_{DV}$, is determined while allowing tire force to be generated as much as possible. In the example described here, while $A_{DV}$ is described as a constant, $A_{DV}$ may be a function of any vehicle condition such as a vehicle speed V, lateral acceleration of a vehicle body. Similarly, $B_{DV}$ may be variably determined so as to surely provide information of turning limit to a driver without causing unwanted excessive increase of a steering angle. One of ordinary skill in the art can appropriately select and determine $A_{DV}$ and $B_{DV}$, i.e. the timing when the modifications of steering assist torque starts, and such use of variable $A_{DV}$ and $B_{DV}$ is considered to be included within the scope of the present invention.

Further, if the variation of steering torque as shown in FIG. 2 is obtained, other ways of determining the increment and decrement of steering assist torque may be employed. For instance, although ERAT components Ta2 and Ta3 are determined independently, these are determined as a single component using an appropriate map of multiple variables. With respect to Kuv, different correction factors may be set for the respective torque components, Ta1, Ta2 and Ta3.

Although the present invention has been described in detail with respect to preferred embodiments thereof and some partial modifications thereof, it will be apparent for those skilled in the art that other various modifications are possible with respect to the shown embodiments within the scope of the present invention.

The invention claimed is:

1. A device for controlling steering of a vehicle having a steering wheel, steered wheels, a power steering apparatus steering the steered wheels at a steering angle determined by rotating the steering wheel and generating steering assist torque under the control of the device, and at least one sensor monitoring a vehicle running condition; the device comprising a portion of determining the steering assist torque in response to steering torque generated on the steering wheel; a portion of generating a value indicating understeer condition of the vehicle based upon a vehicle running condition monitored with the at least one sensor; and a portion of modifying the steering assist torque, which portion increases the steering assist torque in a direction of turning the vehicle when the value indicating understeer condition is higher than a first reference value.

2. A device of claim 1, wherein the assist torque modifying portion does not execute the modification of increasing the steering assist torque in the direction of turning the vehicle when an angular speed of rotating the steering wheel in the direction of turning the vehicle exceeds a reference value.

3. A device of claim 1, wherein the assist torque modifying portion sets an increment of the steering assist torque in the direction of turning the vehicle smaller as an angular speed of rotating the steering wheel in the direction of turning the vehicle is being higher.

4. A device of claim 1, wherein the assist torque modifying portion ceases the increasing of the steering assist torque when the value indicating understeer condition is higher than a second reference value higher than the first reference value.

5. A device of claim 4, wherein the assist torque modifying portion does not execute the modification of increasing the steering assist torque in the direction of turning the vehicle when an angular speed of rotating the steering wheel in the direction of turning the vehicle exceeds a reference value.

6. A device of claim 4, wherein the assist torque modifying portion sets an increment of the steering assist torque in the direction of turning the vehicle smaller as an angular speed of rotating the steering wheel in the direction of turning the vehicle is being higher.

7. A device of claim 1, wherein the assist torque modifying portion decreases the steering assist torque in the direction of turning the vehicle when the value indicating understeer condition is higher than a second reference value higher than the first reference value.

8. A device of claim 7, wherein, as an angular speed of rotating the steering wheel in the direction of turning the vehicle is being higher, the assist torque modifying portion increases a decrement of the steering assist torque in the direction of turning the vehicle when the value indicating understeer condition is higher than the second reference value.

9. A device of claim 1, wherein the assist torque modifying portion does not execute the modification of increasing the steering assist torque in the direction of turning the vehicle when a vehicle speed is not higher than a reference speed value.

10. A device of claim 7, wherein the assist torque modifying portion does not execute the modification of decreasing the steering assist torque in the direction of turning the vehicle when a vehicle speed is not higher than a reference speed value.

* * * * *